United States Patent Office 3,156,620
Patented Nov. 10, 1964

3,156,620
ATTENUATED LIVE RABIES VACCINE AND
METHOD OF PREPARING THE SAME
George Roberts Sharpless, Pearl River, N.Y., assignor to American Cyanamid Company, New York, N.Y., a corporation of Maine
No Drawing. Filed Jan. 10, 1962, Ser. No. 165,298
7 Claims. (Cl. 167—78)

The invention relates to an improved attenuated live rabies virus vaccine and to methods of preparing the product.

Ever since Pasteur produced the first rabies vaccine in 1885, this method of treatment has become of great importance in the protection both of man and economically valuable livestock. The vaccines which have been reproduced hitherto have been contaminated or associated with considerable amounts of various foreign proteins derived from the media in which the vaccine was produced. This has been considered a necessary evil and its often unpleasant side reactions have been accepted as the price for protection against rabies.

Since Pasteur's original work using rabbits to which rabies virus had been adapted, a number of improvements have been made and attempted in the preparation of vaccines. For example, various killed virus vaccines have been made using chemical agents, irradiation and other methods. These killed virus vaccines have the disadvantage that the immunity conferred is not long lasting, requiring annual re-vaccination, and there is no reduction in the contamination with extraneous animal tissue with resulting undesired side effects. It has been proposed to incubate the virulent rabies virus in duck embryos before killing. The resulting vaccine, however, still contains extraneous matter from the duck embryo tissues and still presents the same picture of undesirable side effects. Finally, in United States Patent 2,768,114 a method has been described of preparing live rabies vaccines by serial passage of the virus through chicken embryos. This vaccine has shown excellent long-lasting immunity, but it also is not free of extraneous animal material and so still produces the undesired side effects.

Some viruses have been propagated in tissue cultures, and this method presents many advantages. However, it has hitherto been unusable with rabies virus because the virus, although it would grow for a while, soon reached equilibrium and even degenerated. The reasons for this failure to propagate in tissue cultures, even from chicken embryos, whereas the virus does multiply in the chicken embryos itself, is not known. It has, however, rendered tissue culture methods economically useless in the production of rabies vaccines.

The present invention is based on a surprising discovery (the reasons for which are completely unknown) that rabies vaccine can be effectively propagated in avian tissue cultures by adding certain material thereto. Particularly the tissue cultures may be from chicken embryos, and the added material is a collagen derivative which has been sufficiently hydrolyzed until it is dispersible in cold water, but has not been hydrolyzed to the peptone stage. It is preferred to use hydrolyzed gelatin, but other collagen derivatives having similar properties may be used. Hydrolyzed gelatin is a commercial article and any of the available products are useable.

The amount of collagen derivative to be used is not at all critical. When there is less than 1%, the effectiveness begins to fall off; and, in general, concentrations of less than 0.5% are not desirable. An excellent range is between 1 and 5% with optimum about 2%. Higher percentages given poorer results.

It is an advantage of the present invention that it is useful with any regularly known methods of tissue culture, for example, suspended methods, monolayer methods, and the like. It should be noted that monolayers are used in the ordinary meaning in the art as a single layer of tissue on a substrate. It does not necessarily mean that the layer is one cell thick. In the specific examples there will be described one typical culture method by producing a monolayer in Povitsky bottles. It is, however, illustrative only of one typical method of tissue culture and the invention is not in any sense limited thereto.

In addition to the great process advantages opened by the tissue culture method, the present invention possesses what is perhaps an even more important advantage. A clear vaccine is produced which is so nearly completely free of contaminants that side reactions are very greatly reduced and in many cases eliminated entirely. This represents a great product advantage, for the vaccine retains all of the important properties of the live virus vaccine, such as long lasting immunity, and at the same time eliminates the undesirable side effects which have hitherto been a serious but unavoidable drawback to rabies vaccination. The clear vaccine can be lyophilized and keeps for long periods of time in the dry state. It reconstitutes readily with distilled water and the reconstituted vaccine retains the high potency of the original product.

The live virus vaccine can be produced by the present invention by inoculating the tissue culture either with attenuated live virus, the so called "fixed virus" produced first by Pasteur which is adapted to rabbits, or any other live rabies virus. All of the forms propagate readily on the tissue culture in the presence of the hydrolyzed collagen derivative. For veterinary purposes where live virus vaccines ae useable the vaccine may be used as such. For human use it is customary to kill the vaccine, but the advantages of the present invention with lowered contamination remain.

The tissue culture process is quite flexible and requires no special precautions or modifications, except for the addition of hydrolyzed gelatin or other collagen derivatives, but of course, the normal care required in any tissue culture must be observed. It is preferred to use enzyme treated chicken embryo cells, for example, trypsinized chicken embryo cells. This enzyme treatment of the cells is common in the tissue culture art and is used in the same way as with other tissue cultures when process of the present invention is carried out.

It is a further advantage of the present invention that the process is in no way sensitive to the exact point at which the inoculation with virus is effected. This may be done at the start before the cells are layered, if this method of culture is used, or after layering. It is apparently not material at what point the cells are inoculated.

The tissue culture incubation is effective at the ordinary temperatures that are customarily used as the rabies virus is adapted to grow in animal cells, body temperature, approximately 37° C. is optimum. The temperature, however, is not critical, and the process can be carried out over a temperature range of from 30° C. to 40° C.

The invention will be described in greater detail in conjunction with the following specific example in which the parts are by weight unless otherwise specified.

*Example 1*

A culture of trypsinized chicken embroy cells in a medium containing 0.5% lactalbumin hydrolysate in Earle's balanced salt solution was used. This medium also contained 2% hydrolyzed gelatin and from 1% to 5% sterile horse serum. The medium was inoculated with seed from a chicken embryo propagated live rabies virus which had been passed through the chicken embryos for a sufficient time until it was avirulent to mammals. The inoculated medium containing the cells and the gelatin was filled into Povitsky bottles and allowed to monolayer. It was incubated at 37° C. for about 20 hours. Then the medium was poured off, the cells washed with balanced salt solution and the following medium added to the cells:

|  | Percent |
|---|---|
| Tryptose phosphate broth | 10 |
| Soluble hydrolyzed gelatin | 2 |
| 0.5 lactalbumin hydrolysate in Earle's balanced salt solution | 88 |

The cells were covered with from 0.25 to 0.5 inch of medium and were incubated at 37° C. to a peak titer which required about 3 to 5 days depending on the virus strain. The supernatant medium, which contained the virus was then poured off and lyophilized. The dry product keeps well and can be reconstituted with water to form vaccine. It is substantially free of extraneous animal material.

The concentration of virus in the above example was measured at the beginning and end in various bottles with an average virus titer of $10^{4.0}$ to a harvest titer of $10^{7.3}$ per ml. This represents an increase of about 2,000 times. Other examples ranged from an increase from $10^{2.3}$ to $10^{5.3}$ representing a 1,000 times to $10^{1.5}$ to $16^{6.3}$ representing an increase of 63,000.

*Example 2*

The procedure of Example 1 was repeated, but the inoculation was made after the chicken embryo cells had monolayered. A typical titer increase was from $10^{3.5}$ to $10^{7.0}$.

*Example 3*

The procedure of Example 1 was repeated, but the chicken embryo cells were treated with pancreatin instead of trypsin, and the culture medium used was Earle's medium. The results were substantially the same. Clear supernatant liquids were obtained with virus titer increases in the thousands.

*Example 4*

The stability of the vaccine of the present invention in its liquid form was compared with that of standard commercial rabies vaccine having a titer of $10^{5.5}$. The vaccine produced by the present invention had a titer of $10^{5.3}$. Samples were set up in stoppered vials and tested at room temperature and at somewhat elevated temperatures. The commercial product which was a heavy suspension and not a clear liquid lost all of its viability after 24 hours. The vaccine of the present invention showed much higher stability as represented by the following table:

| Room Temp. (22.8° C.) | | 37° C. | |
|---|---|---|---|
| Time (days) | Titer/ml. | Time (hours) | Titer/ml. |
| 0 | 5.9 | 12 | 5.7 |
| 1 | 4.9 | 24 | 3.9 |
| 2 | 5.4 | 36 | 4.6 |
| 3 | 4.6 | 48 | 4.1 |
| 4 | 4.1 | 60 | 2.7 |
| 5 | 4.4 | 72 | 3.4 |
| 6 | 4.2 | 84 | 2.2 |
| 7 | 4.2 | 96 | 2.2 |

While the above test shows that the liquid vaccine is not indefinitely storable, this should not be confused with the dry lyophilized product which does keep for long periods of time. However, when the vaccine has been prepared by reconstituting with water, it is desirable for it to have a reasonable life. The product of the present invention can be effectively used over a number of days which is a practical advantage of considerable importance.

*Example 5*

A clear vaccine prepared by reconstituting with water the lyophilized product of Example 1 was used on the standard number of guinea pigs, which are a common test animal for this virus as specified in the standard AIQD potency test requirement. Half of the guinea pigs received a 0.25 ml. dose of a tenfold diluted virus having a mouse titer of $10^{4.0}$. The guinea pigs were vaccinated intramuscularly, and none of the inoculated animals showed any sign of disease. The vaccinated guinea pigs, the standard number of five unvaccinated controls, were then challenged with a standard strain of virulent rabies virus. The challenge was by intramuscular injection. All of the control guinea pigs developed rabies and died. None of the vaccinated guinea pigs became ill.

*Example 6*

The potency of the vaccine produced by Example 1 was tested by the standard Habel test. As is customary, mice were used in this test. They were given various amounts of the vaccine from Example 1 and also a commercial killed vaccine and a vaccine obtained by passage through chicken embryos. Vaccination was effected on days 0 and 7. All of the mice were challenged intracerebrally with equal doses of a virulent rabies virus on day 14. The challenge dose was 12.7 mouse $LD_{50}$'s. The amount of vaccine required to protect 50% of the mice was as follows:

| | |
|---|---|
| Killed vaccine | 0.55 mgm. |
| Chicken embryo attenuated vaccine | 6,900 mouse $LD_{50}$'s ($6.9 \times 10^3$). |
| Vaccine from Example 1 reconstituted from the dry product | 3,800 mouse $LD_{50}$'s ($3.8 \times 10^3$). |

I claim:

1. A process of preparing rabies virus vaccine which comprises propagating a live rabies virus in a tissue culture medium of avian embryo cells containing at least 0.5% hydrolyzed soluble gelatin.

2. A process according to claim 1 in which the propagation is effected at approximately 37° C.

3. A process according to claim 1 in which the avian embryo cells are treated with an enzyme before culturing.

4. A process according to claim 1 in which the propagation is in monolayered chicken embryo cells.

5. A process according to claim 1 in which the propagation is effected for not more than about a day, spent medium removed, fresh culture medium containing the hydrolyzed soluble gelatin added to the tissue culture cells and propagation resumed until a harvestable titer of virus is obtained.

6. A process according to claim 5 in which the avian embryo cells are trypsinized before use.

7. A rabies vaccine prepared according to the process of claim 1.

References Cited in the file of this patent

UNITED STATES PATENTS

| 2,768,114 | Koprowski et al. | Oct. 23, 1956 |
| 2,773,800 | Powell | Dec. 11, 1956 |
| 2,912,361 | Froelich | Nov. 10, 1959 |
| 2,915,436 | Fieldsteel | Dec. 1, 1959 |
| 2,965,544 | Cabasso | Dec. 20, 1960 |
| 3,000,788 | Emery | Sept. 19, 1961 |

OTHER REFERENCES

Proc. AVMA 89th Mtg., June 1952, "Symposium on Canine Hepatitis," pp. 223–232.

(Other references on following page)

OTHER REFERENCES

Kilham et al.: "Isolation of an Agent Causing Bilirubinemia and Jaundice in Raccoons" 20 (852), Proc. Soc. Exp. Biol. and Med. (PSEBM), 85 (2), February 1954, pp. 272–275.

Helmboldt et al.: "Distemper Complex in Wild Carnivores Simulating Rabies," Amer. J. Vet. Res. 16 (60), July 1955, pp. 463–469.

Kilham et al.: Jaundice and Bilirubinemia as Manifestations of Canine Distemper in Racoons and Ferrets," Amer. J. Vet. Res. 17, January 1956, pp. 144–148.

Kilham: "Serological Studies of Canine Distemper—Complement Fixation With Spleen Antigens," Am. J. Vet. Res. 17 (64), July 1956, pp. 398–401.

Habermann et al.: "Distemper in Racoons and Foxes Suspected of Having Rabies," J. Am. Vet. M. Asso. 132 (1), pp. 31–5, January 15, 1958.

Kissling: "Growth of Rabies Virus in Nonnervous Tissue Culture (#23997), Proc Soc. Exp. Biol. and Med., vol. 98, No. 2, pp. 223–225, June 1958.

"Combined Vaccine Includes Rabies Vaccine," in JAVMA 136 (1), January 1960, p. 28.